INVENTOR.
Gordon A. Roberts

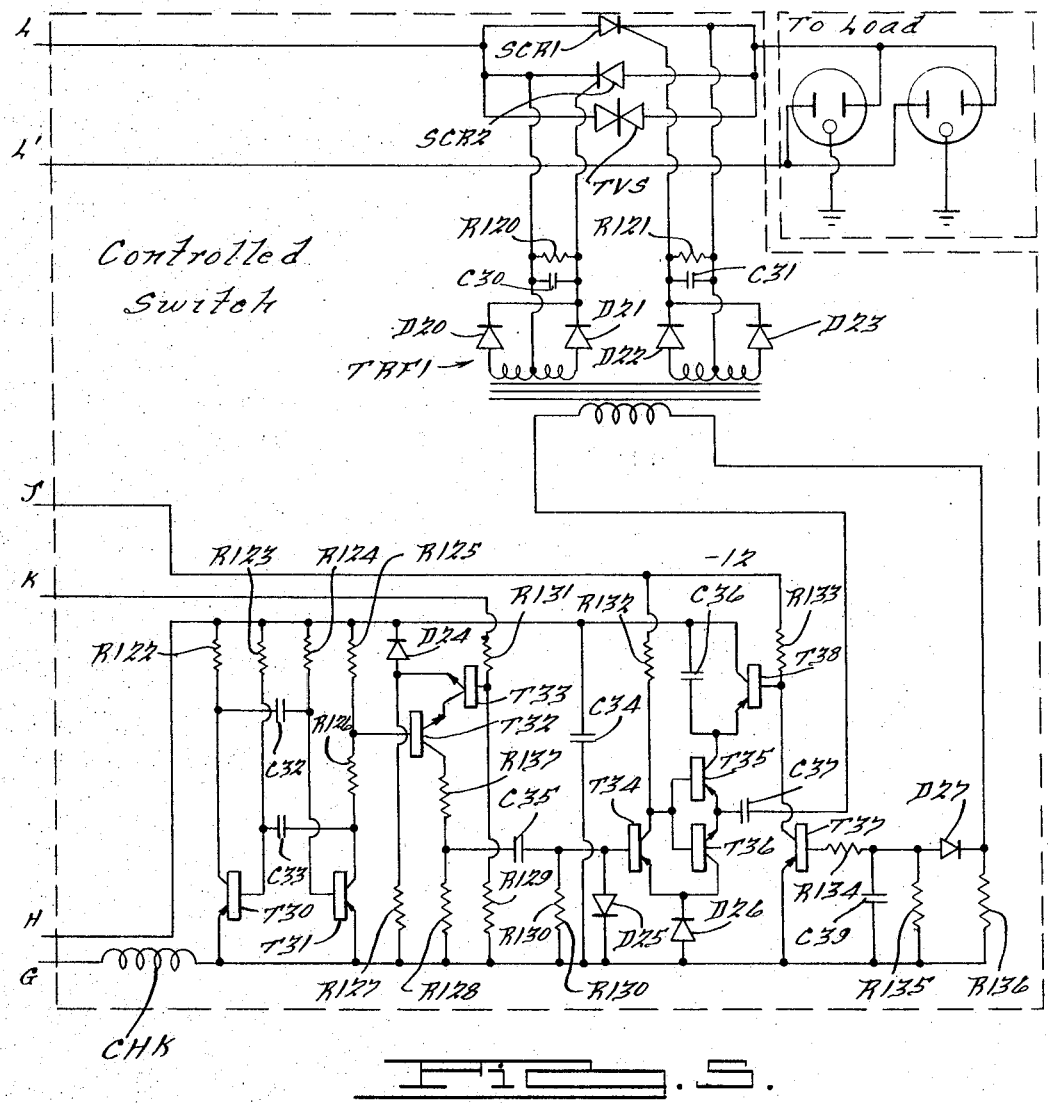

United States Patent Office 3,299,322
Patented Jan. 17, 1967

3,299,322
ELECTRONIC CIRCUIT PROTECTOR
Gordon A. Roberts, Ann Arbor, Mich., assignor to Mechanical Products, Inc., Jackson, Mich., a corporation of Delaware
Continuation of application Ser. No. 211,668, July 23, 1962. This application Aug. 9, 1965, Ser. No. 482,990
5 Claims. (Cl. 317—33)

This invention relates generally to electrical apparatus, and more particularly to an electronic circuit protector. This application is a continuation of my co-pending application Serial No. 211,668 filed July 23, 1962, for "Electronic Circuit Protector," now abandoned.

Conventional circuit breakers generally fall into two categories, namely, those having a relatively long time delay between overload and trip, and those having a relatively short time delay. The time required for both types of circuit breakers to trip upon the occurrence of a relatively small overload is longer than the time required to trip due to a large overload. Thus, the difference between the two types lies in the relative time scales for these inverse-time characteristics, the instantaneous trip circuit breaker having a greatly compressed scale.

The current responsive elements employed in conventional circuit breakers are also of two general types, namely, thermal and magnetic. Thermal elements inherently have a relatively long time delay and are therefore, generally used in circuit breakers which exhibit a pronounced inverse-time characteristic. The time delay of a magnetic element is relatively shorter than that of the thermal element, resulting in the use of such magnetic elements in the so-called "instantaneous" trip circuit breakers. However, a longer time delay is often built into magnetic circuit breakers in order to achieve a more pronounced inverse-time characteristic.

Certain types of loads, for example, wiring and devices having the characteristics of a wire, exhibit an overload characteristic which is essentially inversely related to time following a curve comparable to that of conventional time delay circuit breakers. Therefore, conventional protectors can substantially match the overload characteristics of loads of this nature and thereby provide a reasonably high degree of protection for such loads.

However, the problem of protecting the electronic loads, or, more specifically, electronic loads having a transformer input, has created a need for a different approach to circuit protection. Conventional circuit breakers fail to adequately protect such electronic loads because of the presence of large turn-on current transients in such loads and because of the need for close-in protection and rapid tripping during normal operations.

In an electronic circuit using a transformer input power supply, a large current transient may flow through the transformer primary when the switch is closed, due to the degree of saturation of the transformer core. The occurrence of such a transient is therefore random variable. The only way, heretofore known and used, to protect electronic equipment of this type without excessive tripping of the associated circuit breakers has been to employ an inverse-time delay circuit breaker which is rated at a high enough current rating to allow the transient to pass. The inverse-time characteristic is necessary in order to tolerate the short but relatively large turn-on transient. Due to this same characteristic, however, the circuit breaker will exhibit a relatively large time delay before tripping upon the occurrence of an overload of small magnitude. Therefore, such a breaker is not capable of protecting the circuit against small overloads of relatively short duration, sensitivity and speed of operation having been sacrificed in order to tolerate the turn-on transient. If a short time delay is used, a higher rating will be required to hold the transient, with the result that the ultimate trip point may be several hundred percent higher than the normal load current. Here, sensitivity is sacrificed for speed of action. Thus, for a given load current and transient, a satisfactory compromise may be impossible.

The foregoing problem is not as series if the circuitry utilizes vacuum tubes, in that such tubes inherently have relatively large overload tolerances. In contrast, semiconductors may be destroyed by only momentary overloads, if these overloads exceed the ratings of the semiconductor components. Unless highly overrated components are to be used, an improved system of circuit protection must be incorporated.

The broad object of the instant invention is a solution to the problems incident to protecting the class of loads characterized as transformer input electronic circuitry. The electronic circuit protector of the instant invention solves these problems by offering protection in areas where conventional circuit breakers fail because of their basic characteristics. The electronic circuit protector accommodates any transients present at turn-on, thereafter affording fast acting and close-in protection during normal operation.

The operating characteristics of a conventional circuit breaker are, in general, dependent on load current, and are therefore not correlated with the turn-on of the load. The time required to trip a breaker that has been carrying full load current is slightly less than the time required for the same overload current applied to an unloaded breaker.

The electronic circuit protector of the instant invention presents a trip characteristic that is correlated directly to turn-on time, and which is independent of the magnitude of load current. The electronic circuit protector changes its characteristics with respect to time, time being measured from turn-on of the load.

In other words, the relative size of the current required to trip the electronic circuit protector changes with time, but the time required for the electronic circuit protector to trip on said overload is independent of the margin by which the overload exceeds minimum trip current.

As an example of the foregoing discussion, consider an electronic power supply employing an input power transformer and having semi-conductor diode rectifiers in the secondary thereof. It is a characteristic of transformers that large turn-on current transients may occur when power is applied to the transformer. Such transients may be 10 to 20 times the normal load peak current. It is desirable for the protective device for such circuits to pass the large current transients without opening the circuit, yet give close-in fast tripping protection upon the occurrence of subsequent overloads of relatively small magnitude. The turn-on transient may be 1000 to 2000% of normal load, yet the circuit protector should trip out upon the occurrence of overloads of, for example, two percent within a cycle or less during normal operation.

If a conventional so-called "instantaneous" type circuit breaker is used to protect such a circuit, its rating has to be close to 1000 to 2000% of normal load to tolerate the possible turn-on transients. Obviously, such a conventional circuit breaker does not provide adequate protection to load components during subsequent normal operation unless they also are designed to tolerate 1000 to 2000% overloads.

If a conventional inverse time delay circuit breaker having a relatively long time constant with, for example, an ultimate trip level of 130% of rated load is employed so as to tolerate the turn-on transient, the time constant or degree of time delay required in such a circuit breaker will be a function of its characteristics and the turn-on transient energy. During normal operation, such a circuit breaker will eventually trip on overloads of, for example, 30% or more. However, because the time required to open the circuit upon the occurrence of such an overload may be quite long, for example, a minute or more, semi-conductor circuits may be damaged. Thus, in conventional circuit breakers, there is an inverse relationship between the ability to tolerate turn-on transients and the ability to give subsequent protection.

Accordingly, another object of the instant invention is an electronic circuit protector that is able to tolerate large turn-on transients, yet subsequent to the occurrence of the turn-on transient, offer close-in fast trip protection.

Another object of the instant invention is an electronic circuit protector that provides an independent selection of protection characteristics, depending upon the requirements of the load at any particular time.

Another object of the instant invention is an electronic circuit protector wherein a trip point can be set relatively close to normal rated load of the device being protected.

Another object is an electronic circuit protector that has a relatively short trip time on lower overloads.

Another object is an electronic circuit protector that tolerates large turn-on transients.

Another object is an electronic circuit protector having a stable trip point.

Another object is an electronic circuit protector having a continuous calibration adjustment.

Another object is an electronic circuit protector that is remotely controllable.

Another object is an electronic circuit protector having a programmable trip set that is time or load dependent.

Another object is an electronic circuit protector that is insensitive to shock and vibration.

Other objects and advantages of the instant invention will be apparent in the following specification, claims and drawings wherein:

FIG. 5 is a right-hand portion of the circuit diagram of the electronic circuit protector.

The electronic circuit protector of the instant invention consists of two distinct parts; namely, a switch and a governing control circuit for the switch.

The function of the control circuitry is two-fold; (1) the control provides a manual on-off operation of the switch, and (2) it provides for overload trip opening of the switch caused by an overload in an electric circuit containing the electronic circuit protector. The load conditions that constitute an overload are defined by the control and may be time varying.

One of the important features of the electronic circuit protector is centered around the control function. This control overload trip operation can be analyzed in two steps: (a) sensing the overload, and (b) producing the trip.

Figures 1, 2:
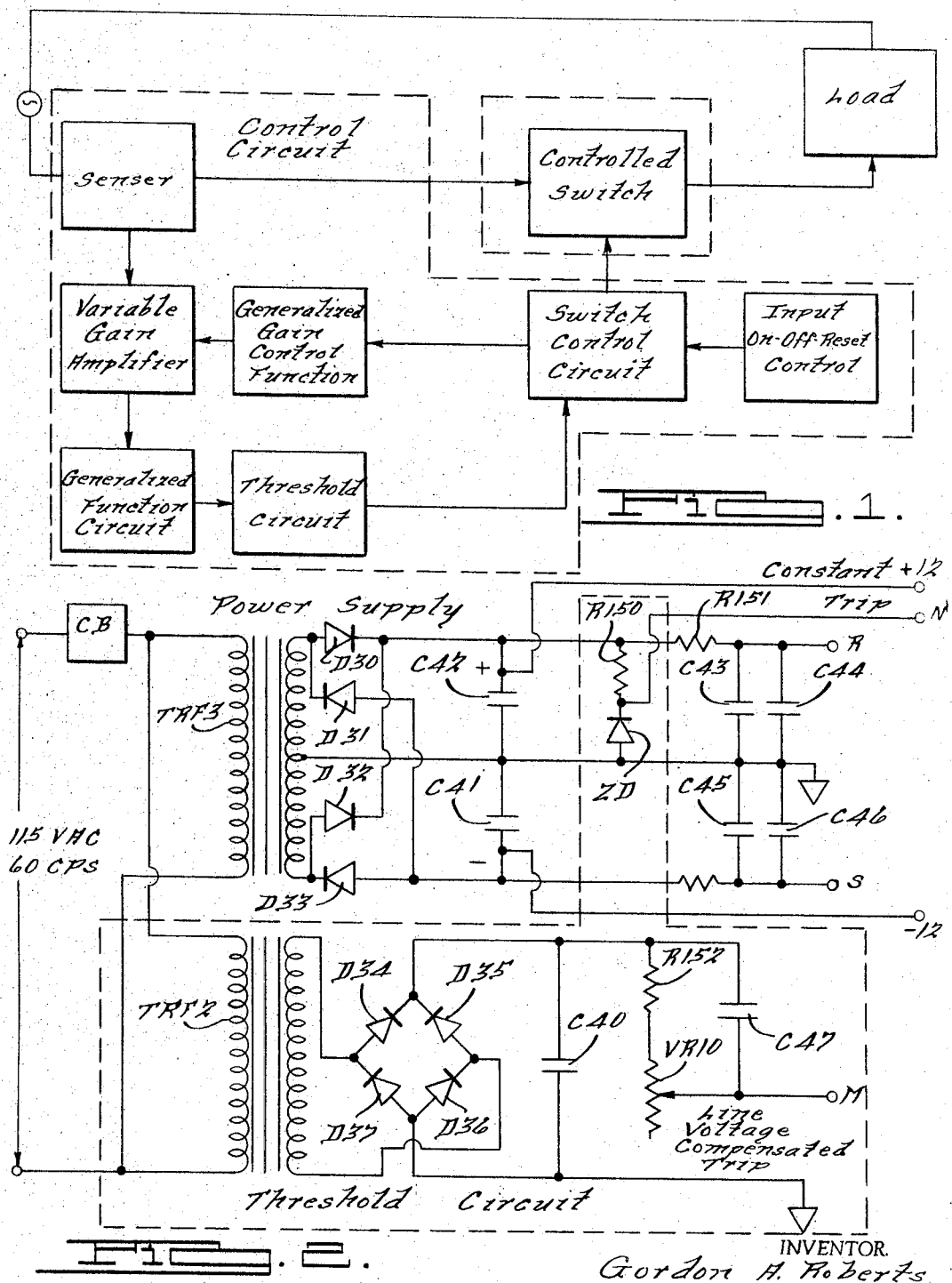
FIGURE 1 is a block diagram of an electronic circuit protector of the instant invention.
FIG. 2 is a circuit diagram of a power supply suitable for use with the electronic circuit protector.

Referring now to FIGURE 1 of the drawings, there is shown, in block diagram, an electronic circuit protector in accordance with an exemplary constructed embodiment of the instant invention. The electronic circuit protector comprises a control circuit and a controlled switch.

The controlled switch is electrically connected to the control circuit and to the load. The load is connected to a source of electrical energy as well as to the control circuit.

The control circuit comprises a sensor, for example, a shunt resistance having an output indicative of conditions in the electrical circuit containing the electronic circuit protector and load. The output of the sensor is amplified by a variable gain amplifier which then drives a generalized function circuit. The output of the generalized function circuit is fed into a threshold circuit. If the generalized function circuit produces an output exceeding a certain specified threshold level, a trip signal is fed to a switch control circuit. The switch control circuit, in addition to controlling the controlled switch, feeds information to a generalized gain control function which determines how the variable gain amplifier is to vary with respect to time or other variables that may be present. The switch control circuit also uses input information from an input, on-off-reset switch to effect control of the input from the threshold circuit.

If, for example, the input on-off-reset control switch is turned to the "on" state, and in turn, turns on the controlled switch, then load current flows through the current senser, and the controlled switch to the load.

In addition to turning on the controlled switch, the switch control circuit also effects control of the generalized gain control function circuit and through this circuit, the variable gain amplifier.

The manner in which the variable gain amplifier is to vary with respect to time and other input control variables will be dependent upon the particular load and the resultant characteristics of the electronic circuit protector. Control is obtained from the characteristics of the generalized gain control function, which would generally be tailored to the particular load. For example, the variable gain amplifier might start at zero gain at zero time, where zero time corresponds to turn-on time, and then gradually change gain until full sensitivity was achieved at some later time such as 100 milliseconds, after turn. From this time on, the gain would remain constant until a new on cycle was initiated.

The generalized function circuit performs some functional operation on the variable gain amplifier output. For example, the function may be full wave rectification. The function might be the determination of the R.M.S. value of the wave form for each preceding half cycle at the end of each half cycle, with no averaging or carry-over from half cycle to half cycle. Beyond these functions, there are many other possibilities. The particular function or functions selected would depend upon the load and the protection criteria for the load.

The threshold circuit senses whether the output of the generalized function circuit exceeds or does not exceed the critical level set. The threshold circuit may be fixed, or the threshold circuit may be a function of some variable, such as line voltage.

It is to be noted that the generalized gain control function could take information from the load and modify the generalized function so that the trip point is varied as a function of load conditions. For example, in a power system, there may be a requirement for sustaining operation, event though an overload exists. Yet, under other conditions, it may be desirable to trip out, due to an overload of the same magnitude. Variables of this nature can be controlled with the generalized gain control function.

One of the other desirable functions that might be performed in the generalized function circuit is the production of an inverse time characteristic where such a characteristic is desired. Such an inverse time characteristic is not to be confused, however, with the inverse time characteristic of conventional circuit breakers heretofore known and used necessary to allow initial turn-on transients to pass.

The turn-on cycle of an exemplary disclosed embodiment of the instant invention may be broken down into three phases or states for the purpose of explanation. It is to be understood that other modes of operation are contemplated, the use of three relatively distinct phases being dictated by a particular load to which the exemplary constructed embodiment was applied.

In state one, trip will not occur regardless of the magnitude of an overload. This feature is obtained by completely inhibiting the threshold circuit during this period.

During state two, the gain of the variable gain amplifier is programmed relative to the turn-on time, resulting in a period of desensitization.

State three is the normal operating mode of the electronic circuit protector at which time it operates at maximum sensitivity.

During state two and three, an overload occurs, which, when combined with the load wave form, exceeds the normal full load peak, a trip signal is generated, producing grip at the next current zero. If the overload occurred late in the first half cycle so that the combined value does not exceed peak value, then the switch will not trip until the next subsequent current zero. For a given overload and state of turn-on-cycle, trip is also influenced by a factor which may be termed the trip mode.

Line voltage variations result in load current variation, which, in the absence of compensation, may be sufficient to trip the switch, even though no overload has occurred. If this is undesirable, the electronic circuit protector can be line voltage compensated, thus eliminating spurious trip. The electronic circuit protector thus has two modes of operation, (1) a constant current mode which trips whenever the current exceeds a preset constant level, and (2) a compensated mode which trips when the current exceeds a level which is proportional to line voltage. It should be noted that compensation with other than linear characteristics can be incorporated, for example, the electronic circuit protector can be compensated for ambient temperature.

SENSER

Figure 3:
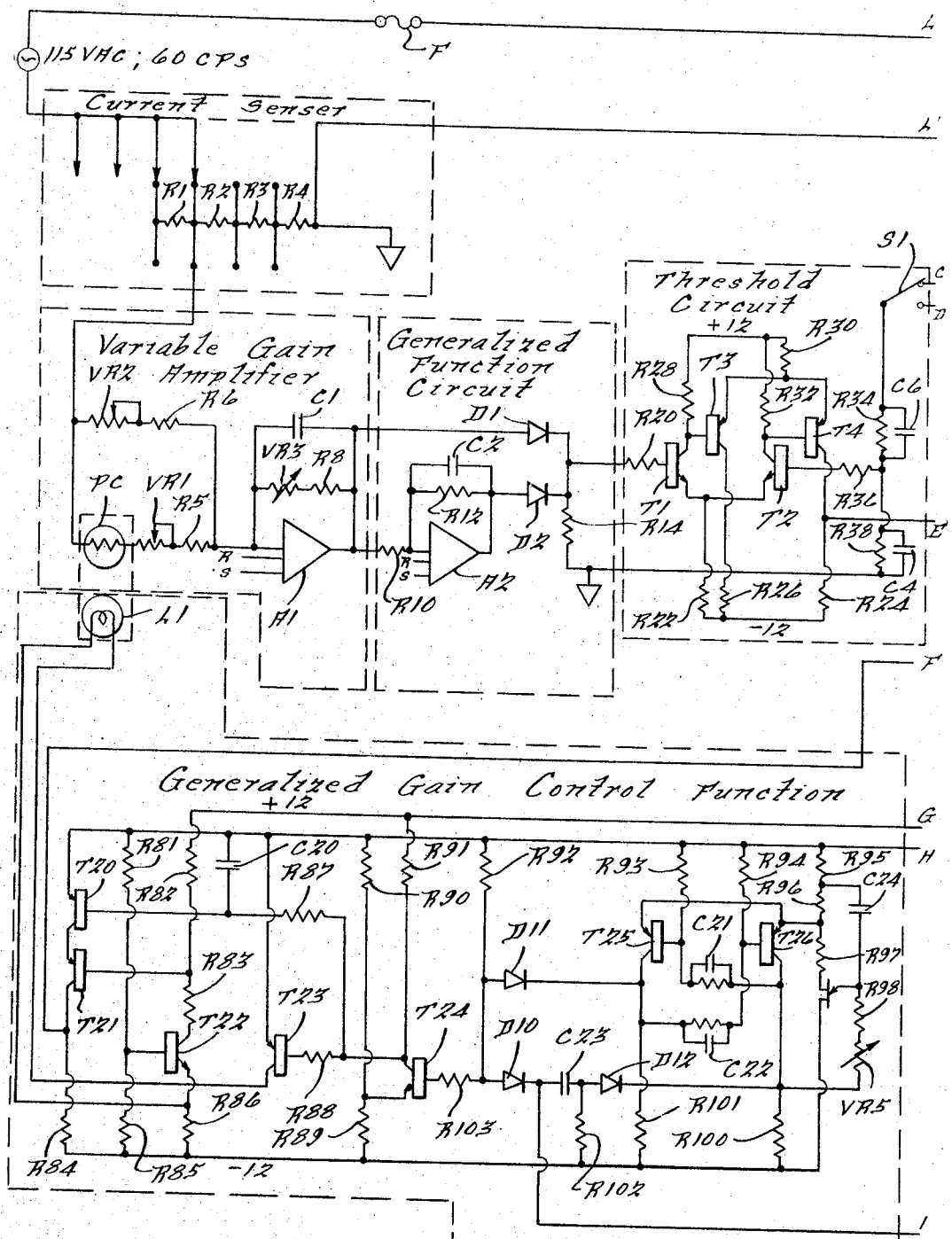
FIG. 3 is a left-hand portion of a circuit diagram of the electronic circuit protector.

As best seen in FIG. 3, the current senser, in an exemplary constructed embodiment of the electronic circuit protector, comprises a plurality of shunt resistors R1, R2, R3 and R4 in series with the load. It is contemplated that other types of sensers having an output indicative of circuit conditions may be employed, the shunt resistors R1, R2, R3 and R4 being exemplary in nature.

VARIABLE GAIN AMPLIFIER

The output of the current senser is fed to the variable gain amplifier which comprises a photocell PC having a variable resistor VR1 and a fixed resistor R5 in series connection therewith and a variable resistance VR2 and fixed resistance R6 in parallel, all of which constitute input resistive elements to an operation amplifier A1. The amplifier A1 has variable resistor VR3, a fixed resistor R8, and a capacitor C1 connected thereacross.

Basically, there are two input resistor networks to the operational amplifier A1, one of which consists of the variable and fixed resistors VR2 and R6, and the other of which consists of the photocell PC in series with the variable and fixed resistors VR1 and R5.

The capacitor C1 and variable resistor VR3 and fixed resistor R8 function as a feed-back around the amplifier A1. VR3 and R8 are the low frequency gain filter elements. The function of the capacitor C1 is to provide a high-frequency cutoff point so that noise and high frequency interference that might get into the input is reduced at the output.

The relationship between the input and feed-back resistance networks is such that the gain equals the ratio of feed-back resistance to the input resistance, so that either the input resistance or the feed-back resistance can be changed to change the gain. For the purposes of calibrating the equipment, the variable resistor VR3 in the feed-back network is used as a gain control. When the feed-back resistance is fixed, further gain control can be obtained by changing the resistance of the input resistor network.

As will be discussed in greater detail, when the electronic circuit protector is in state two, which is the desensitized state, the photocell PC is dark, and the resistance thereof is relatively high. Thus, since the resistance of the photocell PC is relatively large compared with the parallel path of the resistors VR2 and R6 during the desensitized state, gain is determined by the particular setting of the variable resistor VR2, plus R6 relative to the resistance of the feed-back network.

When the circuit changes from state two to state three, a lamp L–1 in the generalized gain control function circuit is energized. The lamp L–1 functions as an on or off control by effecting a change in the resistance of the photocell PC from a high value to a relatively low value. It is to be noted, however, should it be desired to vary gain as a function of time, that the intensity of the lamp L can be controlled so as to produce a specified resistance in the photocell PC in order to get a specified gain.

When the lamp L attains full brightness, the resistance of the photocell PC is minimized. When this condition obtains, resistance of the photocell PC is relatively small in comparison with the resistance R6 plus VR2 and PC plus VR1 plus R5 in their relationship to the feed-back network resistance primarily determines gain.

The variable resistor VR1 functions as a trip set control which is used to set the actual trip level during state three or the normal state of the electronic circuit protector 6. It may be manually controllable so as to provide a trip set range from minus 10% of rated current to plus 90% overload. The variable resistor VR–2 is the control that sets the trip point during the desensitized interval or state two. The variable resistor VR3 in the feed-back network is a fine calibration control.

GENERALIZED FUNCTION CIRCUIT

The generalized function circuit effects full wave rectification of output from the variable gain amplifier in the exemplary example. It is to be noted, however, that the generalized function circuit can be used to generate all sorts of other functions, e.g., an average value of the full wave rectified input current, or whatever the input variable might be. Alternatively, it can be used to generate an average value over half-cycle intervals or over several cycle intervals. Alternatively, the generalized function circuit can produce the R.M.S. value of the input wave form over, for example, an interval of a half-cycle or longer.

As best seen in FIG. 3, the generalized function circuit comprises an input resistor R10 that feeds an amplifier A2. A feed-back resistor R12 is connected across the amplifier A2. In order to reduce noise and high frequency response beyond a certain point, a capacitor C2 is connected across the feed-back network. A pair of diodes D1 and D2 constitute the rectifiers, one of which is fed with an in-phase signal and one of which is fed with an out-of-phase signal. The outputs of the diodes D1 and D2 are connected to a load resistor R14.

THRESHOLD CIRCUIT

The output of the generalized function circuit is fed to the threshold circuit. The threshold circuit compares the instantaneous value of the output from the generalized function circuit with a specified threshold level. The threshold level may be a variable that is dependent upon a function which is fed into the threshold circuit, or it may be fixed. Comparison of the input voltage to a reference voltage is effected by a cascade difference amplifier comprising transistors T1, T2, T3 and T4. A reference input voltage which, in the present system, is a D.C. voltage, comes in through a reference selector switch S1. The D.C. voltage may be a constant or related to, for example, input line frequency. If the input to the base of the transformer T2 is of a certain specified level, and if the input to the base of the transistor T1 is of relatively smaller voltage, the threshold circuit does not produce a trip signal. The threshold circuit basically is a difference amplifier, the output of which is a nonlinear function that is produced by a very small difference between the input and reference voltages.

As the input level from the generalized function circuits is increased to a point where it balances the reference signal, the threshold circuit produces a response that is an output trip signal. This output trip signal appears across a resistor R24 to the base of a transistor T7 in the initial inhibiting circuit.

INITIAL INHIBITING CIRCUIT

Figure 4:
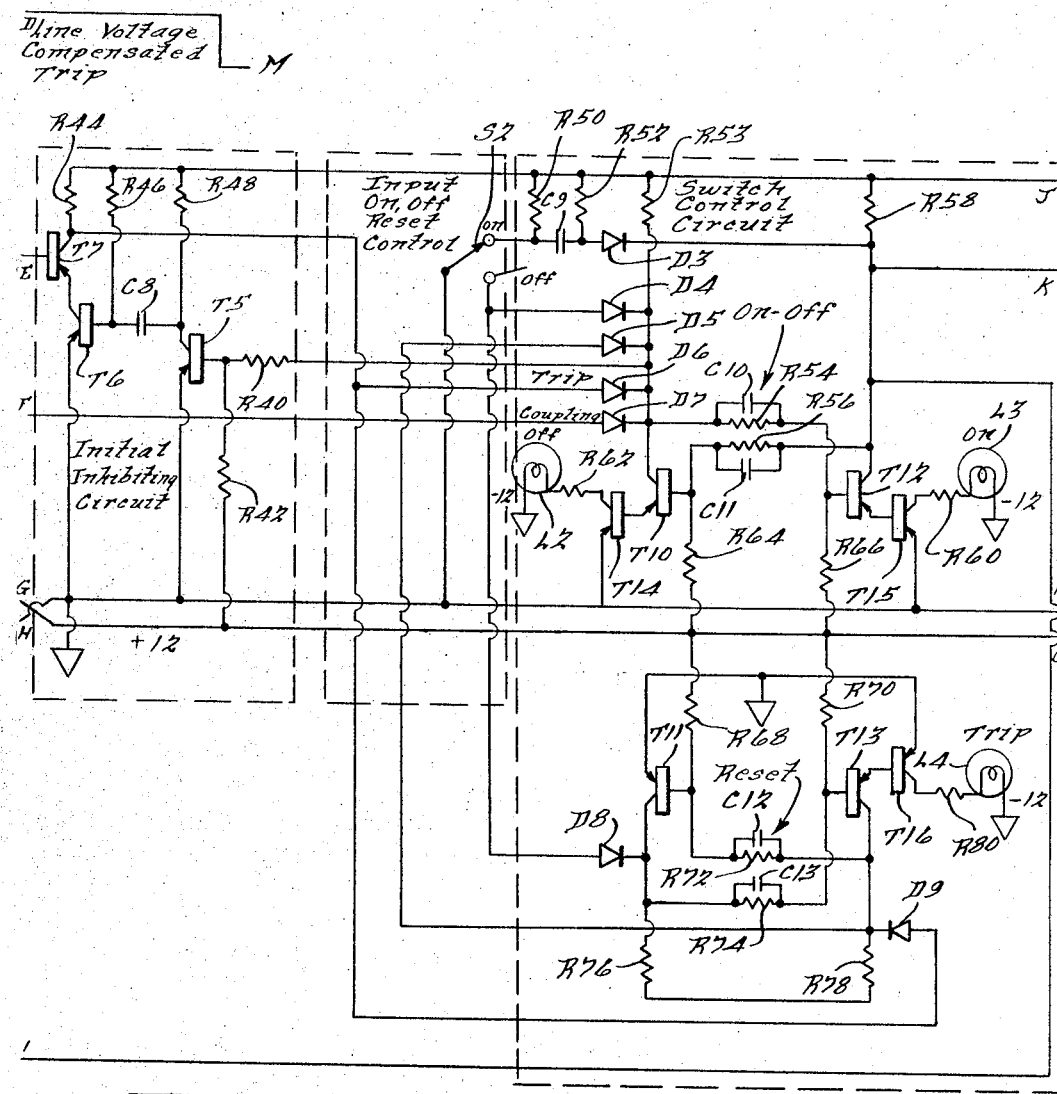
FIG. 4 is an intermediate portion of the circuit diagram of the electronic circuit protector.

The initial inhibiting circuit is seen in FIG. 4. The initial inhibiting circuit completely inhibits, for a specified period of time, the turn-on cycle. This is a function that is part of the generalized gain control circuit but is more easily influenced at this point.

As best seen in FIG. 4, the initial inhibiting circuit comprises a transistor T5 which is fed through a pair of resistors R40 and R42 so as to function as a switch.

The transistor T5 has in its collector circuit a capacitor C-8 which is coupled to the base of a transistor T6. The transistors T6 and T7 constitute a series "and" circuit which is the logic circuit used for inhibiting. Thus, even though a signal is applied to the transistor T7 from the resistor R24 in the threshold circuit, there is no output signal therefrom if the lower transistor T6 is cut off. The function of the transistor T5 and the coupling capacitor C8 is to put a signal into the base of the transistor T6 such as to cut it off for roughly the first two cycles. This constitutes a timing network based upon the relationship of the capacitor C8 and the resistance in the circuit, thereby to determine how long the transistor T6 will be cut off. A variation in the number of cycles that the transistor T5 is inhibited can be effected by changing the value of the capacitor C8, or the circuit resistance.

The transistor T5 is controlled by the input on-off-reset control which controls turn-on. Thus, the initial inhibiting circuit only operates for the first two cycles after the electronic circuit protector has been turned into its "on" state.

INPUT ON, OFF, RESET CONTROL

As seen in FIG. 4, the input on-off-reset control comprises a single throw, double throw switch S2 that effects manual control of "on," "off," and "reset" of the entire system.

SWITCH CONTROL CIRCUIT

As seen in FIG. 4, the switch control circuit comprises a pair of flip-flop networks designated as "on-off" and "trip." The "on-off" flip-flop network controls the state of the controlled switch 10. The trip flip-flop network controls a trip indicator lamp L-4 which indicates when the electronic circuit protector is in the tripped state.

The "on-off" flip-flop is fed from an "off" terminal of the input on-off-reset switch S1 through a diode D4 to the collector of a transistor T10 that forms the "off" side of the on-off flip-flop. Similarly, the off terminal of the switch S2 is connected through a diode D8 to the collector of a transistor T-11 forming one side of the trip flip-flop. Thus, when the input on-off reset switch S1 is in the off state, the on-off flip-flop is forced to the "off" condition and the reset flip-flop is forced to the "reset" condition. When the on-off reset switch S1 is switched to the "on" state, a pulse is generated. The pulse, through a diode D3, flips the "on-off" flip-flop 132 into the "on" state. This pulse is generated by a resistance capacitance network comprising a pair of resistors R50 and R52 and a capacitor C9.

As the capacitor C9 builds up a charge through the resistor R52, the on-off flip-flop is decoupled from the switch S2 by the diode D3. Even though the switch S2 is in the "on" state, an internal "off" signal from some source other than the switch S2 can turn the on-off flip-flop to the "off" state. Thus, the electronic circuit protector of the exemplary example is trip-free in operation.

A plurality of diodes D4, D5, and D6 couple into the on-off flip-flop which are not coupled to the on-off switch S2. The function of the diode D6 is to couple a trip signal from the threshold circuit and passed by the initial inhibiting circuit to the on-off flip-flop.

It is to be noted that a trip signal to the diode D6 is also fed to a diode D9 in the trip flip-flop. Thus, when a trip signal occurs, the on-off flip-flop 132 and the trip flip-flop move to the "off" and "tripped" states, respectively. It should be noted that this is different from what occurs when the on-off reset switch is turned off, at which time the on-off flip-flop 132 shifts to the "off" state, but the trip flip-flop 134 is shifted to the reset state. Thus, depending upon the type of "off" signal to the on-off flip-flop, the trip flip-flop goes to the "tripped" or "reset" condition.

The diode D5 couples into the on-off flip-flop from the trip indicator flip-flop and performs what may be termed a redundant function. When, for example, power is applied to the system when the switch S2 is in the "on" state, the trip indicator may go to the tripped state. If this occurs, then the on-off flip-flop should be off. Thus, the trip indicator flip-flop is coupled to the on-off flip-flop through the diode D5 to insure that the on-off flip-flop goes to the "off" state when the trip indicator flip-flop is in the tripped condition.

The diode D7 is coupled to the off side of the on-off flip-flop from the generalized gain control function. If the lamp L–1 in the generalized control function should burn out, the life thereof being relatively shorter than the life of the other components of the electronic circuit protector, the variable gain amplifier is left in the desensitized state. It is desirable for the electronic circuit protector to be shut off if there is such a lamp bulb failure. Thus, the function of a signal coming into the diode D7 is to shift the on-off flip-flop to the "off" condition.

The on-off flip-flop has a pair of transistors T14 and T15 which are used to switch a pair of "off" and "on" lamps L–2 and L–3, respectively. When the on-off flip-flop is in the "off" state, the transistor T10 is conductive, thereby turning off the transistor T5 in the initial inhibiting circuit, and vice versa. If T5 is off (which corresponds to the electronic circuit protector being off) and if R46, R48, C8, T6 are in an electrical steady state, then the initial inhibiting circuit could pass trip signals. However, if such signals were to pass, they would not influence the on-off flip-flop since it is already off. Assuming that T5 is turned on, C8 will instantaneously hold its charge or voltage, thus T6 is turned off, which inhibits any trip signals. As soon as T5 is turned on, C8 begins to charge, the rate of charge is determined by the equivalent resistance of the discharge path. This is primarily R48. At some predictable time after T5 is turned on, the charge on C8 will have charged sufficiently to again turn on T6. The timing for this operation in the exemplary mode is about 32 milliseconds. After T6 turns on, trip signals are no longer inhibited. Thus, this circuitry inhibits trip signals for about the first two cycles after turn-on at 60 c.p.s. line frequency.

GENERALIZED GAIN CONTROL FUNCTION

It is desirable to turn on the pilot lamp L–1 in the generalized gain control function thereby to turn on the photocell PC at a prescribed time in the sequence of events of the system. After the completely inhibited interval of, for example, two cycles, there is a desensitized interval of approximately 60 to 180 milliseconds, after which period the electronic circuit protector changes from the desensitized state to a sensitive state.

It is to be noted that this time sequence runs from turn-on time of the electronic circuit protector. Since L1 controls the shift from the desensitized state to the sensitive state, it is desired to turn the lamp L–1 on at some predetermined time subsequent to when the system is first turned on. If an extremely short time delay is all that is required, the time delay characteristic of the lamp L–1, namely, its thermal lag incident to heating up, may be adequate. However, if a somewhat longer delay is desired, a delay circuit must be provided. Thus, the generalized gain control circuit performs three functions;

(1) to perform a delay which constitutes a desensitized period before turn-on of the lamp L-1, (2) to turn the lamp L-1 on and insure that it will remain on subsequently as long as the system remains in the "on" state, and (3) to sense the condition of the lamp L-1 when it is on. If the lamp should be on but has failed, then to turn off the on-off flip-flop.

As seen in FIG. 3, the lamp L-1 is connected between the emitter of a transistor T-22 and a resistor R86. The other side of the lamp L-1 is connected to the collector of a transistor T23. The transistor T23 is a switching transistor that determines whether current flows to the lamp L-1 or not. The resistor R86 is a current sensing resistor that senses whether or not there is lamp current flowing.

The collector of the "on" transistor T12 in the on-off flip-flop is coupled into the generalized gain control function through a capacitor C23 and diode D10. The capacitor C23, in conjunction with a resistor F102, constitute a differentiating network that couples to a single shot multi-vibrator circuit. The single shot multi-vibrator provides the 60 to 180 millisecond time delay or desensitized period referred to hereinbefore.

The diode D12 is coupled to a variable resistor VR-5 which provides internal adjustment of the time delay.

The output of the single shot multi-vibrator is connected to the diode D11. An output of the on-off flip-flop is connected to the diode D10. Diodes D10 and D11 constitute an "and" circuit. In its stable state, the single shot multi-vibrator has T25 conducting, thus D11 is back biased. At the same time, if the on-off flip-flop is off, then D10 is conducting, T24, T23 and L1 are off. If the on-off flip-flop is turned on, then the unstable state of the single shot multi-vibrator is initiated and T25 becomes non-conducting, which forward biases D11 while at the same time the change in the state of the on-off flip-flop causes D10 to be back biased. However, at least one of the two diodes D10 or D11 is holding T24 off so the lamp is held off. D10 will remain back biased so long as the on-off flip-flop is on. But D11 will only remain back biased as long as the single shot multi-vibrator is in its unstable state. This time of being in the unstable state is determined by the time constants of the single shot multi-vibrator, which, in the exemplary model, is set for 60 to 180 milliseconds by control VR5. This controls the time of the densitized interval (state 2). When both D11 and D10 become back biased, then T24, T23 and L1 are turned on. Thus, state 3, the sensitive state, is achieved.

Three transistors T-20, T-21, and T-22 control the on-off flip-flop in relation to the condition of the pilot lamp L-1. The transistor T-22 has in series with its emitter the resistor R-86 which senses current flow in the lamp L-1 circuit. When the current sensed by the resistor R-86 is below a minimum required to illuminate the lamp L-1, it indicates that the pilot lamp L-1 is burned out, and the electronic circuit protector should be turned off. If normal current flows through the resistor R-86, the transistor T-22 is cut off. When the transistor T-22 is cut off, the transistor T-21 is cut off. When the transistor T-21 is cut off, the coupling diode D-7 in the on-off flip-flop is back biased thereby driving the on-off flip-flop to the "off" condition.

If there is inadequate current going through the resistor R-86 and if there is a signal into the other transistor T-20 through the resistor R-87 and a capacitor C-20, both the transistors T-20 and T-21 will conduct, driving the on-off flip-flop to the "off" condition through the diode D-7.

CONTROLLED SWITCH

A transformer TRF-1 in the controlled switch circuit is used to provide voltage isolation between the load switch and its control circuit. Each side of the output of the transformer TRF-1 is coupled through a plurality of diodes D-20, D-21, D-22, and D-23, which effect full wave rectification of the transformer output, the D.C. voltage being applied to the gate cathode input of a pair of silicon-controlled rectifiers SCR-1 and SCR-2. Thus, when there is an A.C. signal of the proper frequency and magnitude at the input of the transformer TRF-1, then there is a rectified D.C. signal at the two outputs of the transformer which, in turn, forward bias the gate cathode junction of the silicon-controlled rectifier SCR-1 and SCR-2.

In the absence of an input, the silicon-controlled rectifiers SCR-1 and SCR-2 turn off at the first current zero after the removal of power to the gate thereof.

A transient voltage suppressor TVS is inserted across the silicon-controlled rectifier SCR-1 and SCR-2 to aid in clipping transient voltages which might be developed thereacross.

The input to the silicon-controlled rectifier drive transformer TRF-1 is a 50-kc. square wave which is obtained from a drive circuit comprising a free running multi-vibrator. The output of the multi-vibrator is between a resistor R-125 and a resistor R-126 that feed a transistor T-32. The transistor T-32, along with a transistor T-33, form a series "And" circuit that produces a desired output sequence.

If the on-of flip-flop is in the "on" state, then this "And" circuit has a 50-kc. output.

The transistor T-32 has a resistor R-137 in its collector circuit that is coupled through a capacitor C-35, to the base of a transistor T-34 driving a complementary emitter follower circuit consisting of the transistors T-35 and T-36.

A diode D-25 is coupled to the base of the transistor T-34 to equalize load on the capacitor C-35. The emitter of the transistor T-34 has a relatively constant voltage bias provided by a diode D-26. The emitter follower has a regulator circuit that consists of a capacitor C-36 in shunt with a transistor T-36. The purpose of the transistor T-36 and the capacitor C-36 is to provide a regulator circuit which provides for control of the voltage source in response to the primary current of TRF-1.

If the current to the drive transformer TRF-1 exceeds a certain level, a current limiting circuit reduces the current. A diode D-27, resistor R-135 and a capacitor C-39 couple the base of a transistor T-37 to the input current of the transformer TRF-1 which is sensed by R-136. These elements sense current in the transformer TRF-1 and, in turn, control the transistor T-36 so as to limit the maximum current.

POWER SUPPLY

The power supply is conventional in nature, except for the portion thereof forming a part of the threshold circuit. As seen in FIGS. 3 and 4, the threshold circuit includes a reference voltage or trip mode switch S-1. The switch S-1 effects either the line voltage compensated or constant current trip modes of operation.

In the constant current trip mode, a constant voltage is provided to the threshold circuit that is generated by a power supply comprising a resistor R-150 and a zener diode ZD. The constant voltage output provides a constant voltage reference to the threshold circuit, which corresponds with a constant current tripping point.

When it is desired to operate in the line voltage compensated mode, a voltage is provided which, for most practical purposes, may be assumed to have a linear relationship to line voltage. In other words, if line voltage drops, the tripping point is lowered. This mode of operation is based on the assumption that if an overload occurs, it bears a percentage relationship to normal rated current.

A transformer TRF-2 has a bridge rectifier in its secondary comprising a plurality of diodes D-34, D-35, D-36 and D-37. This along with C-40, R-152, VR-10, C-47 provides a line voltage compensated reference voltage to the threshold circuit.

From the foregoing description, it should be apparent that the electronic circuit protector incorporates an approach to the problem of circuit protection which materially differs from conventional circuit protectors.

The electronic circuit protector provides close-in protection and fast trip response, and yet it is capable of tolerating the large turn-on transients associated with the input to transform circuits. The actual trip current level of the electronic circuit protector is variable over a range of overloads.

The major system components of the electronic circuit protector are a switch, and a control circuit which controls the sequence of operations constituting the turn-on cycle. This cycle is characterized by varying the sensitivity of the circuit protector in what may be termed three chronologically related intervals, i.e., state one, state two, and state three.

State one of the turn-on cycle is identified by complete trip inhibition, which means that the electronic circuit protector will not trip, regardless of load size. It is to be noted, however, that the silicon-controlled rectifiers SCR-1 and SCR-2 are protected by a current limiting fuse F which opens the circuit on excessively large loads. This inactive portion of the turn-on cycle lasts for a preset time, for example, two cycles.

State two involves an interval of 60 to 180 milliseconds, the exact value being an internal adjustment, in which the trip function operates at a reduced sensitivity. The trip level for State two can be adjusted from, for example, 1000% to 5000% overload.

In State three, the protector operates at maximum sensitivity. This state is the normal operating mode of the device, if the on-off reset switch is "on" and trip has not occurred prior to this point, the protector will remain in State three until either the power is disconnected, or an overload occurs.

Whenever the instantaneous load current exceeds a predetermined level, the control circuit produces a trip signal to the controlled switch. The controlled switch trips on the first load current zero subsequent to the trip signal. The current necessary to trip the circuit protector is dependent only on the particular state involved when overload occurs, and is unrelated to load current prior to overload.

It is understood that the specific constructions of the improved electronic circuit protector herein disclosed and described are presented for the purpose of explanation and illustration and are not intended to indicate limits of the invention, the scope of which is defined by the following claims.

TABLE OF COMPONENT VALUES IN AN EXEMPLARY CONSTRUCTED EMBODIMENT

*Senser*

|  | Ohms |
|---|---|
| R-1 | .25 |
| R-2 | 1.25 |
| R-3 | .03 |
| R-4 | .03 |

*Variable gain amplifier*

| VR-1 | 2K. |
|---|---|
| VR-2 | .1 meg. |
| VR-3 | 50K. |
| R-5 | 2K. |
| R-6 | 20K. |
| R-8 | 20K. |
| PC | Clairex CL504L. |
| A-1 | Philbrich P65. |
| C-1 | .001 µfd. |

*Generalized function circuit*

| R-10 | 51K. |
|---|---|
| R-12 | 51K. |
| R-14 | 22K. |
| A-2 | Philbrich P65. |
| C-2 | .001 µfd. |
| D-1 | 1N461A. |
| D-2 | 1N461A. |

*Threshold circuit*

| R-20 | 10K. |
|---|---|
| R-22 | 150K. |
| R-24 | 10K. |
| R-26 | 10K. |
| R-28 | 68K. |
| R-30 | 1.5K. |
| R-32 | 68K. |
| R-34 | 9.1K. |
| R-36 | 10K. |
| R-38 | 40K. |
| T-1 | 2N336A. |
| T-2 | 2N3363. |
| T-3 | 2N1305. |
| T-4 | 2N1305. |
| C-4 | .02 µfd. |
| C-6 | .02 µfd. |
| S-1 | S.P.D.T. |

*Initial inhibiting circuit*

| R-40 | 18K. |
|---|---|
| R-42 | 47K. |
| R-44 | 2.2K. |
| R-46 | 22K. |
| R-48 | 2.2K. |
| T-5 | 2N1305. |
| T-6 | 2N1305. |
| T-7 | 2N1305. |
| C-8 | 2 µfd. |

*Input-on-off-reset*

| S-2 | S.P.D.T. |
|---|---|

*Switch control circuit*

| R-50 | 22K |
|---|---|
| R-52 | 22K |
| R-53 | 2.2K |
| R-54 | 5.6K |
| R-56 | 5.6K |
| R-58 | ohms 680 |
| R-60 | do 68 |
| R-62 | do 68 |
| R-64 | 22K |
| R-66 | 22K |
| R-68 | 22K |
| R-70 | 22K |
| R-72 | 5.6K |
| R-74 | 5.6K |
| R-76 | 2.2K |
| R-78 | 2.2K |
| D-3 | 1N461A |
| D-4 | 1N461A |
| D-5 | 1N461A |
| D-6 | 1N461A |
| D-7 | 1N461A |
| D-8 | 1N461A |
| D-9 | 1N461A |
| C-9 | .022 µfd. |
| C-10 | 500 pfd. |
| C-11 | 500 pfd. |
| C-12 | 500 pfd. |
| C-13 | 500 pfd. |
| T-10 | 2N1305 |
| T-11 | 2N1305 |

TABLE—Continued

| | | |
|---|---|---|
| T-12 | | 2N1305 |
| T-13 | | 2N1305 |
| T-14 | | 2N1305 |
| T-15 | | 2N1305 |
| T-16 | | 2N1305 |

*Generalized gain control function*

| | | |
|---|---|---|
| R-81 | | 47K |
| R-82 | | 22K |
| R-83 | | 5.6K |
| R-84 | | 2.2K |
| R-85 | | 10K |
| R-86 | ohms | 39 |
| R-87 | | 5.6K |
| R-88 | | 1K |
| R-89 | ohms | 680 |
| R-90 | | 1.5K |
| R-91 | | 5.6K |
| R-92 | | 10K |
| R-93 | | 10K |
| R-94 | | 10K |
| R-95 | ohms | 15 |
| R-96 | do | 390 |
| R-97 | do | 330 |
| R-98 | | 10K |
| R-100 | | 1K |
| R-101 | | 1K |
| R-102 | | 10K |
| R-103 | | 5.6K |
| T-20 | | 2N1305 |
| T-21 | | 2N1305 |
| T-22 | | 2N1304 |
| T-23 | | 2N1305 |
| T-24 | | 2N1304 |
| T-25 | | 2N1305 |
| T-26 | | 2N1305 |
| C-20 | | .1 µfd. |
| C-21 | | .02 µfd. |
| C-22 | | .02 µfd. |
| C-23 | | .12 µfd. |
| C-24 | | 1.5 µfd. |
| D-10 | | 1N461A |
| D-11 | | 1N461A |
| D-12 | | 1N461A |
| VR-5 | | 100K |

*Controlled switch*

| | | |
|---|---|---|
| SCR1 | | 2N687. |
| SCR2 | | 2N687. |
| TVS | | GE6RS21SASD5. |
| D-20 | | 1N461A |
| D-21 | | 1N461A |
| D-22 | | 1N461A |
| D-23 | | 1N461A |
| D-24 | | 1N461A |
| D-25 | | 2N1305 |
| D-26 | | 1N2070 |
| D-27 | | 1N461A |
| C-30 | | 4 µfd. |
| C-31 | | 4 µfd. |
| C-32 | | 200 pfd. |
| C-33 | | 200 pfd. |
| C-34 | | 100 µfd. |
| C-35 | | 4 µfd. |
| C-36 | | 25 µfd. |
| C-37 | | 4 µfd. |
| C-39 | | 4 µfd. |
| R-120 | | 1K |
| R-121 | | 1K |
| R-122 | | 1K |
| R-123 | | 68K |

TABLE—Continued

| | | |
|---|---|---|
| R-124 | | 68K |
| R-125 | ohms | 180 |
| R-126 | | 1K |
| R-127 | | 1K |
| R-128 | ohms | 470 |
| R-129 | | 10K |
| R-130 | | 5.6K |
| R-131 | | 5.6K |
| R-132 | | 1K |
| R-133 | | 1K |
| R-134 | ohms | 220 |
| R-135 | do | 220 |
| R-136 | do | 3.3 |
| T-30 | | 2N1305 |
| T-31 | | 2N1305 |
| T-32 | | 2N1304 |
| T-33 | | 2N1304 |
| T-34 | | 2N1305 |
| T-35 | | 2N1305 |
| T-36 | | 2N1304 |
| T-37 | | 2N1305 |
| T-38 | | 2N1612 |

*Power supply*

| | | |
|---|---|---|
| CB | | Mechanical products MP 1500 .5 amp. |
| ZD | | 1N825. |
| D-30 | | 1N1692. |
| D-31 | | 1N1692. |
| D-32 | | 1N692. |
| D-33 | | 1N692. |
| D-34 | | 1N461A. |
| D-35 | | 1N461A. |
| D-36 | | 1N461A. |
| D-37 | | 1N461A. |
| C-40 | | 25 µfd. |
| C-41 | | 6000 µfd. |
| C-42 | | 6000 µfd. |
| C-43 | | 100 µfd. |
| C-44 | | 2 µfd. |
| C-45 | | 100 µfd. |
| C-46 | | 2 µfd. |
| C-47 | | .02 µfd. |
| R-150 | ohms | 680 |
| R-151 | do | 100 |
| R-152 | do | 20 |
| VR-10 | | 5K |
| TRF-2 | | RT201 |
| TRF-3 | | P6465 |
| F | | Chase-Shawmut 15 amp. 250 v. |

What is claimed is:

1. In an electrical circuit comprising a source of electrical energy and a load, an electronic circuit protector for interrupting the electrical circuit upon the occurrence of a predetermined condition therein, said electronic circuit protector comprising a signal responsive switch electrically connected to the source and load, means for sensing electrical conditions in the circuit having an output signal, a switch control circuit normally responsive to the output from said means for controlling the condition of said switch, an inhibiting circuit for inhibiting the output of said sensing means for a predetermined initial period subsequent to turn-on of said electronic circuit protector, and a desensitizing circuit for desensitizing said switch control circuit for a predetermined period of time subsequent to the inhibited period.

2. An electronic circuit protector for interrupting an electrical circuit upon the occurrence of a predetermined condition therein, said electronic circuit protector comprising a signal responsive switch electrically connected in said circuit, and a control circuit having a time dependent characteristic for controlling the condition of said switch, said control circuit comprising means for sensing an electrical condition in the circuit having an output signal, a variable gain amplifier for controlling the variations of the output of said sensing means, a generalized function circuit for modifying the output from the variable gain amplifier in accordance with a desired function, a threshold circuit for comparing the output of said generalized output function circuit with a reference output, an on-off-reset control switch for providing on and off control of the controlled switch and reset of the control circuit, a switch control circuit for determining the state of the signal responsive switch in response to the state of the on-off-reset switch and the threshold circuit, and a generalized gain control function for controlling variations of the variable gain amplifier in relation to time.

3. An electronic circuit protector for interrupting an electrical circuit upon the occurrence of a predetermined condition therein, said electronic circuit protector comprising a signal responsive switch electrically connected in said circuit, and a control circuit having a time dependent characteristic for controlling the condition of said switch, said control circuit comprising means for sensing an electrical condition in the circuit having an output signal, a variable gain amplifier for controlling the variations of the output of said sensing means, a generalized function circuit for modifying the output from the variable gain amplifier in accordance with a desired function, a threshold circuit for comparing the output of said generalized output function circuit with a reference output, an on-off-reset control switch for providing on and off control of the controlled switch and reset of the control circuit, a switch control circuit for determining the state of the signal responsive switch in response to the state of the on-off-reset switch and the threshold circuit, and a generalized gain control function for controlling variations of the variable gain amplifier in relation to load.

4. An electronic circuit protector for interrupting an electrical circuit upon the occurrence of a predetermined condition therein, said electronic circuit protector comprising a signal responsive switch electrically connected in said circuit, and a control circuit having a time dependent characteristic for controlling the condition of said switch, said control circuit comprising means for sensing an electrical condition in the circuit having an output signal, a variable gain amplifier for controlling the variations of the output of said sensing means, a generalized function circuit for modifying the output from the variable gain amplifier in accordance with a desired function, a threshold circuit for comparing the output of said generalized output function circuit with a reference output, an on-off-reset control switch for providing on and off control of the controlled switch and reset of the control circuit, a switch control circuit for determining the state of the signal responsive switch in response to the state of the on-off-reset switch and the threshold circuit, and a generalized gain control function for controlling variations of the variable gain amplifier in relation to time and load.

5. An electronic circuit protector for interrupting an electrical circuit upon the occurrence of a predetermined condition therein, said electronic circuit protector comprising a signal responsive switch electrically connected in said circuit, and a control circuit having a time dependent characteristic for controlling the condition of said switch, said control circuit comprising means for sensing an electrical condition in said electrical circuit having an output signal, a threshold circuit for triggering upon the occurrence of said predetermined condition, a generalized function circuit for modifying said sensor means in accordance with a predetermined function, and a variable gain amplifier connected in said control circuit to control gain between said sensor and said threshold circuit for determining the trip characteristic.

References Cited by the Examiner
UNITED STATES PATENTS

| | | | |
|---|---|---|---|
| 2,551,022 | 5/1951 | Larstrup | 317—49 |
| 3,079,533 | 2/1963 | Kotheimer | 317—31 X |
| 3,160,788 | 12/1964 | Antoszweski et al. | 317—36 |

MILTON O. HIRSHFIELD, *Primary Examiner.*

SAMUEL BERNSTEIN, *Examiner.*

J. D. TRAMMELL, *Assistant Examiner.*